United States Patent
Gami et al.

(10) Patent No.: US 9,649,732 B2
(45) Date of Patent: May 16, 2017

(54) DEVICE FOR SEALING ORIFICES ON NOZZLE OF FUEL INJECTOR FOR AUTOFRETTAGE PROCESS

(71) Applicant: Caterpillar Inc., Peoria, IL (US)

(72) Inventors: Rahul N. Gami, Peoria, IL (US); Marion B. Grant, Princeville, IL (US); John S. Miller, Jr., Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 68 days.

(21) Appl. No.: 14/304,119

(22) Filed: Jun. 13, 2014

(65) Prior Publication Data

US 2015/0360330 A1     Dec. 17, 2015

(51) Int. Cl.
*B21K 21/08* (2006.01)
*F02M 61/16* (2006.01)
(Continued)

(52) U.S. Cl.
CPC ............... *B23P 9/02* (2013.01); *B21K 21/08* (2013.01); *B23P 9/00* (2013.01); *B23P 17/00* (2013.01); *F02M 61/168* (2013.01); *F02M 61/18* (2013.01); *F02M 2200/03* (2013.01); *F02M 2200/8053* (2013.01); *F02M 2200/9061* (2013.01); *Y10T 29/49433* (2015.01); *Y10T 29/49805* (2015.01); *Y10T 29/49806* (2015.01); *Y10T 29/53996* (2015.01)

(58) Field of Classification Search
CPC .................. F02M 61/168; F02M 61/18; F02M 2200/8053; F02M 2200/9061; B23P 17/00; B23P 9/00; B23P 9/02; B23P 9/025; Y10T 29/49394; Y10T 29/49432; Y10T 29/49433; Y10T 29/49805; Y10T 29/53978; Y10T 29/53796
USPC .............. 72/54, 56, 379.2, 412, 413; 81/486
See application file for complete search history.

(56) References Cited

U.S. PATENT DOCUMENTS

| 1,056,084 | A | * | 3/1913 | Bates | ........................ | H01K 3/32 |
| | | | | | | 81/484 |
| 3,039,534 | A | * | 6/1962 | Koop | ..................... | E21B 33/068 |
| | | | | | | 166/123 |

(Continued)

FOREIGN PATENT DOCUMENTS

| DE | 102011000121 | 9/2011 | |
| DE | EP 2383459 A1 * | 11/2011 | ........... F02M 47/027 |

(Continued)

*Primary Examiner* — Essama Omgba
(74) *Attorney, Agent, or Firm* — William R. Tinker

(57) ABSTRACT

A system for sealing a plurality of orifices through a wall of a vessel is provided. The system includes a plurality of sealing members configured to releasably seal respective orifices of the plurality of orifices. The system also includes a base defining a central axis therethrough. The base includes a plurality of segments disposed about the central axis. Each of the plurality of segments includes an outer surface and an inner surface. The inner surface is configured to engage at least one sealing member of the plurality of sealing members. Further, each segment of the plurality of segments is configured to deform toward the central axis on application of a force upon the outer surface thereof to bias the at least one sealing member into sealing engagement with a respective orifice of the plurality of orifices.

16 Claims, 14 Drawing Sheets

(51) Int. Cl.
*B23P 17/00* (2006.01)
*B23P 9/00* (2006.01)
*B23P 9/02* (2006.01)
*F02M 61/18* (2006.01)

(56) References Cited

U.S. PATENT DOCUMENTS

| | | | | |
|---|---|---|---|---|
| 3,126,827 | A * | 3/1964 | McReynolds, Jr. | E21B 33/136 102/319 |
| 3,362,478 | A * | 1/1968 | McReynolds, Jr. | E21B 33/136 166/123 |
| 3,952,737 | A * | 4/1976 | Lipfert | A61F 6/08 128/837 |
| 4,066,125 | A * | 1/1978 | Bassani | E21B 33/126 166/202 |
| 4,993,390 | A * | 2/1991 | Ono | F02M 55/004 123/456 |
| 5,317,939 | A * | 6/1994 | Marinescu | H01K 3/32 294/100 |
| 5,809,850 | A * | 9/1998 | Tickner | H01J 9/006 294/209 |
| 6,739,220 | B1 * | 5/2004 | Johnson | B25B 9/00 81/53.1 |
| 6,941,841 | B2 * | 9/2005 | Johnson | B25B 9/00 81/53.1 |
| 7,143,668 | B2 * | 12/2006 | Johnson | B25B 9/00 81/53.1 |
| 7,568,862 | B2 * | 8/2009 | Buxton | E21D 20/028 405/259.5 |
| D610,887 | S * | 3/2010 | Vivatvanit | D8/14 |
| 8,381,402 | B2 * | 2/2013 | Grant | F02M 61/168 239/533.1 |
| 8,590,815 | B2 | 11/2013 | Michlik et al. | |
| 9,133,802 | B2 * | 9/2015 | Gami | F02M 61/168 |
| 2010/0154501 | A1 | 6/2010 | Kampmann et al. | |
| 2011/0126393 | A1 * | 6/2011 | Grant | F02M 61/168 29/421.1 |
| 2011/0180634 | A1 * | 7/2011 | Sander | F02M 61/06 239/533.2 |
| 2011/0315793 | A1 | 12/2011 | Michlik et al. | |

FOREIGN PATENT DOCUMENTS

| | | | |
|---|---|---|---|
| EP | 1298313 | 4/2003 | |
| EP | 2320064 | 6/2012 | |
| EP | 2510128 | 10/2012 | |
| JP | 2009052452 | 3/2009 | |
| JP | 2012184717 | 9/2012 | |
| WO | WO 0183979 A1 * | 11/2001 | F02M 61/14 |
| WO | WO 2009026011 A1 * | 2/2009 | B23B 27/24 |
| WO | 2011070063 | 6/2011 | |

* cited by examiner

DEVICE FOR SEALING ORIFICES ON NOZZLE OF FUEL INJECTOR FOR AUTOFRETTAGE PROCESS

CROSS-REFERENCE TO RELATED APPLICATION

The present application is a continuation-in-part and claims the benefit of U.S. Pat. No. 9,133,802 B2, issued on Sep. 15, 2015, which matured from U.S. patent application Ser. No. 13/890,652, filed on May 9, 2013, the disclosure of which is hereby incorporated by reference herein in its entirety for all purposes.

TECHNICAL FIELD

The present disclosure relates to a device for sealing orifices on a vessel, and more particularly to a device for sealing orifices on a nozzle of a fuel injector for an autofrettage process.

BACKGROUND

Ever more stringent emissions regulations have driven the compression ignition engine industry to adopt increased fuel injection pressures. One area of concern as a consequence of increased injection pressures relates to potential fatigue in the sac region of the fuel injector nozzle tip component. The sac region is often the thinnest pressure containment metallic layer, and also defines the nozzle outlets that extend between an interior volume of the fuel injector to the combustion space of the engine. The sac region will typically cycle through extreme high pressures with each engine cycle.

One strategy believed to have promise in strengthening fuel system components is to induce compressive residual stress on the inner surfaces of the component. While a number of different strategies are possible for inducing compressive residual stress, an autofrettage process can be effective in inducing homogenous compressive residual stress on the interior surfaces of pressure vessels. An autofrettage process typically involves subjecting an inside of the vessel to a large fluid pressure so that residual compressive stresses are introduced on the inside of the vessel. To accomplish autofrettage in a high pressure vessel having one or more orifices, the orifices may be sealed prior to application of fluid pressure on the inside of the vessel. U.S. Publication No. 2011/0126393 relates to a production robust autofrettage process for strengthening fuel injector nozzle tips. The process includes applying a vacuum to the interior volume of the nozzle tip. Plugs are suctioned over each of the nozzle outlets. Nozzle outlets are blocked by pressing the plugs between the nozzle tip and a fixture component. The nozzle tip is then autofrettaged at least in part by pressurizing the interior volume with an autofrettage liquid. The plugs are then removed from the nozzle outlets leaving the nozzle tip strengthened with compressive residual stress.

SUMMARY

In one aspect, the present disclosure provides a system for sealing a plurality of orifices through a wall of a vessel. The system includes a plurality of sealing members configured to releasably seal respective orifices of the vessel. The system also includes a base defining a central axis therethrough. The base includes a plurality of segments disposed about the central axis. Each of the plurality of segments includes an outer surface and an inner surface. The inner surface is configured to engage at least one sealing member of the plurality of sealing members. Further, each segment of the plurality of segments is configured to deform toward the central axis on application of a force upon the outer surface thereof to bias the at least one sealing member into sealing engagement with a respective orifice of the plurality of orifices.

In another aspect, the present disclosure provides a base for a system for sealing a plurality of orifices through a wall of a vessel. The base includes a plurality of segments disposed about a central axis of the base. Each of the plurality of segments includes an outer surface and an inner surface. The inner surface is configured to engage at least one sealing member of the plurality of sealing members. Further, each segment of the plurality of segments is configured to deform toward the central axis on application of a force upon the outer surface thereof to bias the at least one sealing member into sealing engagement with a respective orifice of the plurality of orifices.

In another aspect, the present disclosure provides a method for sealing a plurality of orifices through a wall of a vessel. The method includes locating each of a plurality of sealing members to align with a corresponding orifice of the plurality of orifices. The method also includes locating a plurality of segments of a base to engage the plurality of sealing members. The method further includes applying a force on an outer surface of each segment of the plurality of segments to deform each segment toward a central axis of the base to bias the plurality of sealing members into sealing engagement with the plurality of orifices.

DETAILED DESCRIPTION

Reference will now be made in detail to specific embodiments or features, examples of which are illustrated in the accompanying drawings. Generally, corresponding or similar reference numbers will be used, when possible, to refer to the same or corresponding parts.

Autofrettage processes may introduce residual compressive stress to an inside surface of a component, and is known to be used in the production of fuel lines, and other hydraulic and mechanical systems that are typically subjected to large internal fluctuating pressures. Autofrettaging involves pressurizing the component past the yield strength of the interior material, but below the yield strength for the material closer to the outside diameter of the component. One challenge in such a high pressure hydraulic process is sealing effectively.

Figure 1:
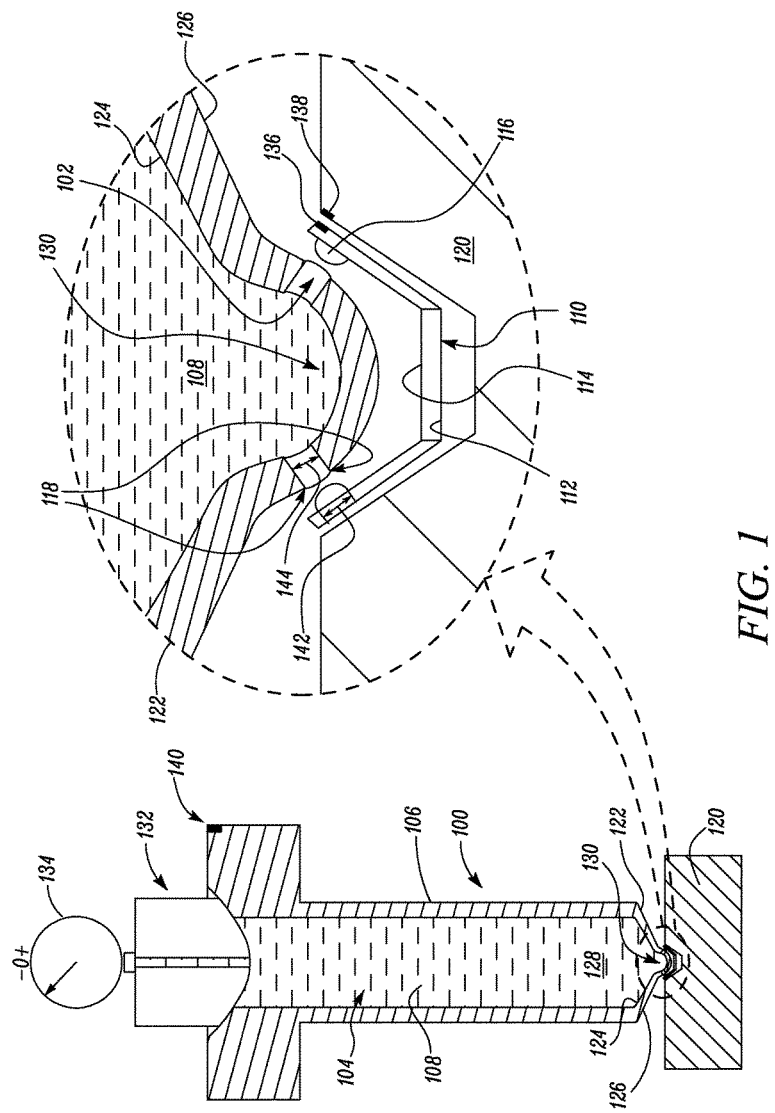
FIGS. 1-2 illustrate a sectional view of a device employed in autofrettaging a vessel.
Figure 2:
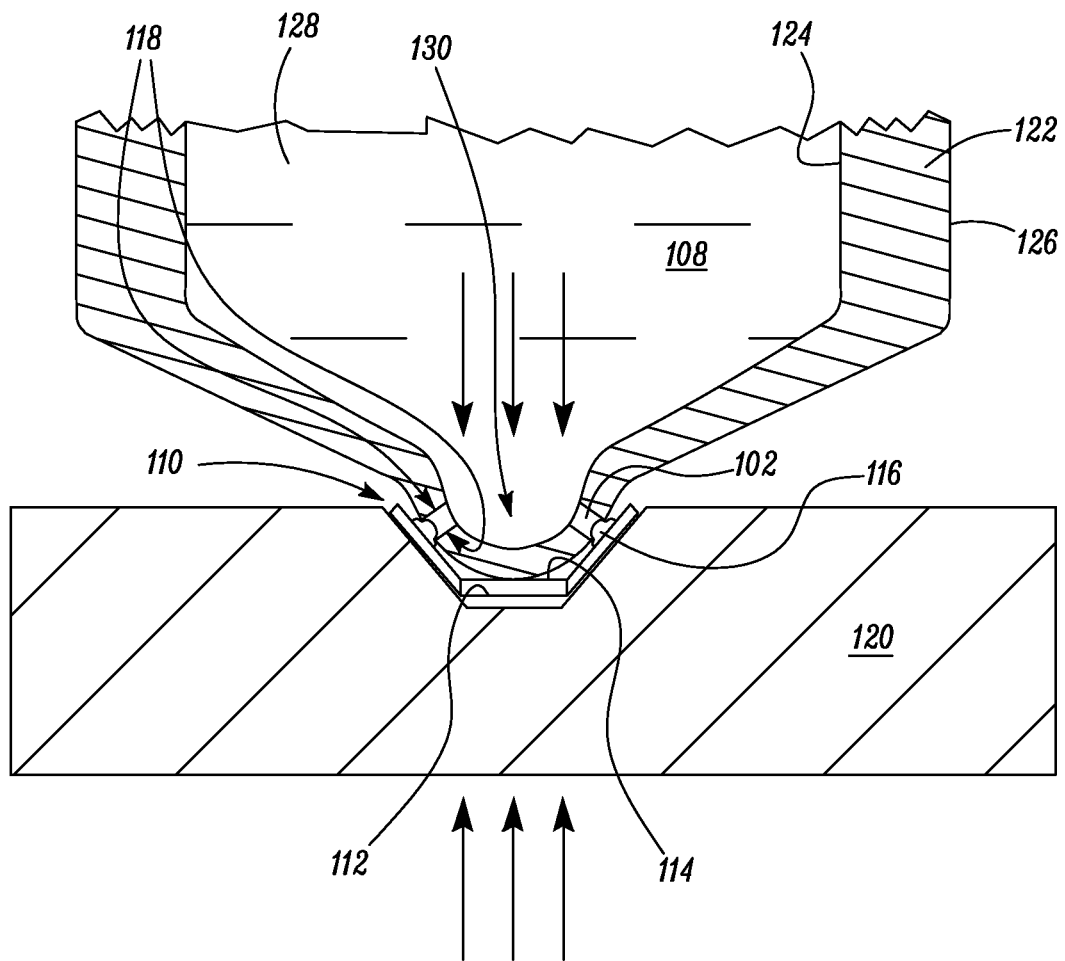

Referring now to FIGS. 1 and 2, a vessel 100 including at least one orifice 102 is illustrated in an autofrettage process. The vessel 100 is configured for use in pressurizing a fluid 104. In the embodiment illustrated, the vessel 100 includes a fuel injector tip 106, and the fluid 104 includes an autofrettage liquid 108. Also illustrated is a device 110 for sealing one or more orifices 102 on the vessel 100 and allowing the fluid 104 to pressurize in the vessel 100. The device 110 includes an outer surface 112 and an inner surface 114. The inner surface 114 includes one or more protrusions 116. In the embodiment illustrated, the protrusions 116 include a substantially semi-spherical shape and are located on the device 110 in a pattern corresponding to the pattern of the orifices 102 on the vessel 100. The protrusions 116 may be located on the device 110 in a manner configured to seal the orifices 102 when pressed into contact with edge 118 of the orifices 102. The device 110 is described in more detail in relation to FIGS. 3-8. In the embodiment illustrated, the outer surface 112 of the device 110 is configured to rest on an autofrettage tool 120 while the inner surface 114 of the device 110 is configured to face the vessel 100 containing orifices 102. The outer surface 112 includes a profile conjugate to a profile of the autofrettage tool 120 thus allowing the outer surface 112 of the device 110 to rest on the autofrettage tool 120. The device 110 may be used in embodiments other than autofrettaging, where sealing of the orifices 102 on the vessel 100 is desired. For example, the device may be used to seal the orifices 102 on the vessel 100 during a high pressure test where the fluid 104 is pressurized in the vessel 100.

In the embodiment illustrated, the fuel injector tip 106 includes a nozzle 122. The nozzle 122 includes an interior surface 124 and an exterior surface 126. The nozzle 122 defines orifices 102 through which fuel may be injected into an engine combustion chamber (not shown). The protrusions 116 are configured to seal the orifices 102 on the nozzle 122. The orifices 102 extend from the interior surface 124 to the exterior surface 126 of the nozzle 122. The nozzle 122 defines an interior volume 128 including a sac region 130. In the embodiment illustrated, the nozzle 122 is shown with an attached pressure component 132 configured to supply pressurized fluid within the interior volume 128 of the nozzle 122. Further, a pressure gauge 134 is illustrated, coupled to the pressure component 132, and configured to measure the fluid pressure within the interior volume 128 of the nozzle 122.

In the illustrated embodiment, the device 110 may include an indicia 136 configured to align with a timing mark 138 on the autofrettage tool 120. The indicia 136 is located such that when the indicia 136 is aligned with the timing mark 138 on the autofrettage tool 120, the protrusions 116 on the inner surface 114 align to the orifices 102 on the nozzle 122. The location of the orifices 102 on the nozzle 122 may be known to a manufacturer. Correspondingly, the manufacturer may locate the protrusions 116, the indicia 136, and the timing mark 138 such that when the indicia 136 are aligned to the timing mark 138, the protrusions 116 align to the orifices 102.

In alternative embodiments, the indicia 136 may be configured to align with a timing mark 140 on the fuel injector tip 106, or with timing marks 140, 138, on the nozzle 122 and the autofrettage tool 120. The timing mark 140 may be provided adjacent to a top end of the fuel injector tip 106. In other embodiments, other methods of aligning the protrusions 116 with the orifices 102 may be used as would be known by an ordinary person skilled in the art.

In the illustrated embodiment, a diameter 142 of the protrusions 116 is greater than a diameter 144 of the orifices 102. In alternative embodiments, where the protrusions 116 include alternative shapes, dimensions of the protrusions may be selected such that when pressed against the orifices 102, the protrusions 116 seal the vessel 100 to block a flow of the fluid 104 out of the vessel 100 through the orifices 102, as would be known by an ordinary person skilled in the art.

In the embodiment illustrated, the protrusions 116 are configured to contact the edge 118 of the orifices 102. As illustrated in FIG. 2, upon contact of the protrusions 116 with the edge 118 of the orifices 102, the autofrettage tool 120 may apply a force on the outer surface 112 of the device 110 such that the protrusions 116 are biased towards the orifices 102. Further application of force on the outer surface 112 may plastically deform the protrusions 116 at the edge 118 of the orifices 102 and seal the orifices 102. The autofrettage process may then proceed by pressurizing an interior volume 128 of the nozzle 122 by the pressure component 132 using the autofrettage liquid 108. Upon completion of the autofrettage process, the device 110 may be withdrawn from the nozzle 122 such that the deformed protrusions 116 are withdrawn from the respective orifices 102.

The protrusions 116 may include a protrusion material, and the nozzle 122 may include a nozzle material. The protrusion material may be softer than the nozzle material such that the protrusions 116 plastically deform upon being forced against the edge 118 of the orifices 102 by the autofrettage tool 120. In one example, the nozzle 122 may include heat treated tool steel having a Rockwell hardness of 55 RC and the protrusions 116 may include stainless steel having a Rockwell hardness of 30 RC allowing the stainless steel protrusions 116 to plastically deform upon application of force from the autofrettage tool 120.

Figure 3:
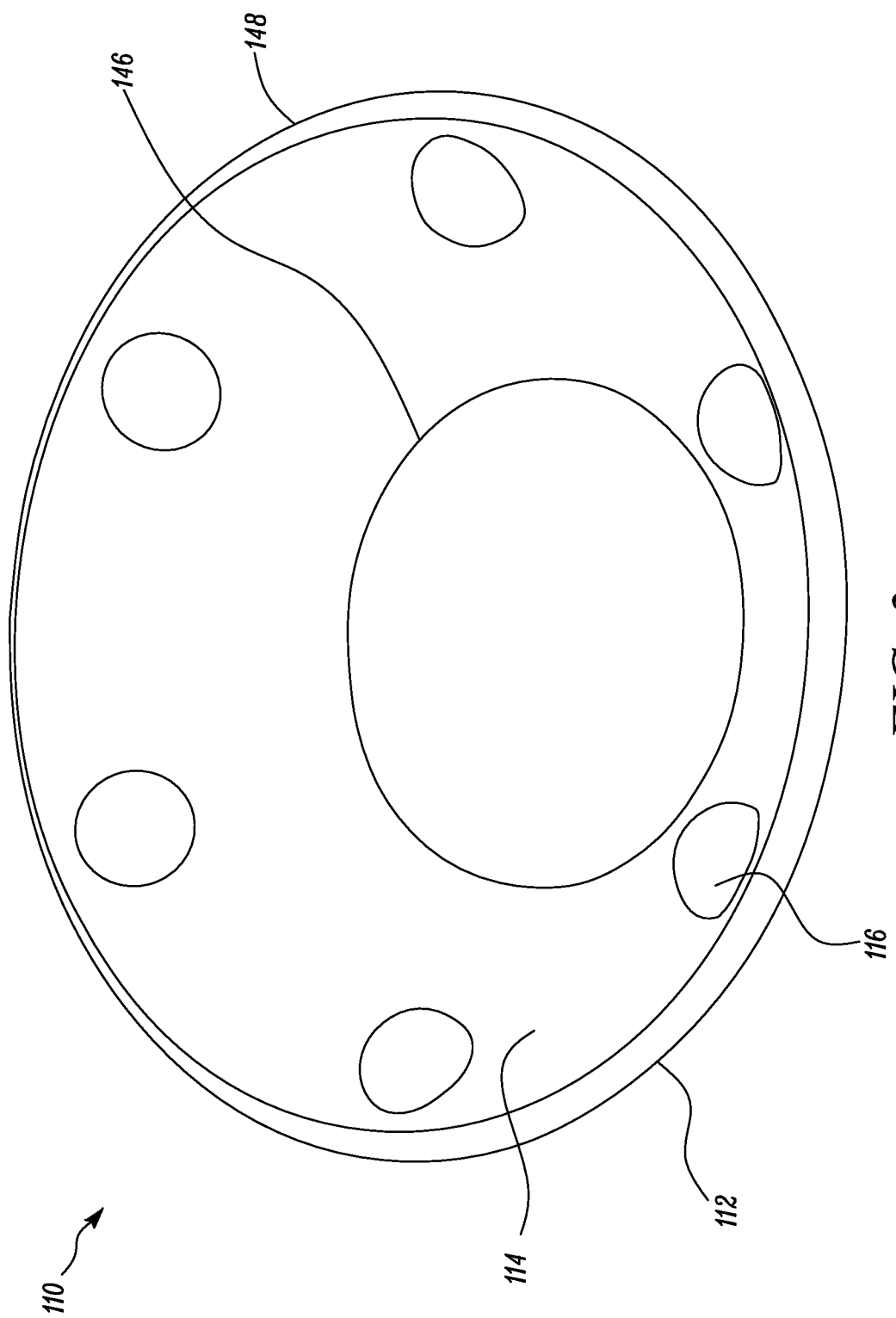
FIG. 3 illustrates a perspective view of an embodiment of the device including protrusions having a substantially semi-spherical shape.

Referring now to FIG. 3, a perspective view of an embodiment of the device 110 is illustrated. In the embodiment of FIG. 3, the protrusions 116 include a substantially semi-spherical shape. In alternative embodiments, the protrusions 116 may include any shape operable to seal the orifices 102 on the vessel 100. In some embodiments, all of the protrusions 116 may include similar shapes. In alternative embodiments, some of the protrusions 116 may include one shape while the other protrusions 116 may include other shapes. In the embodiment illustrated, the device 110 may include a frustum-shape defining an inner periphery 146 and an outer periphery 148.

Figure 4:
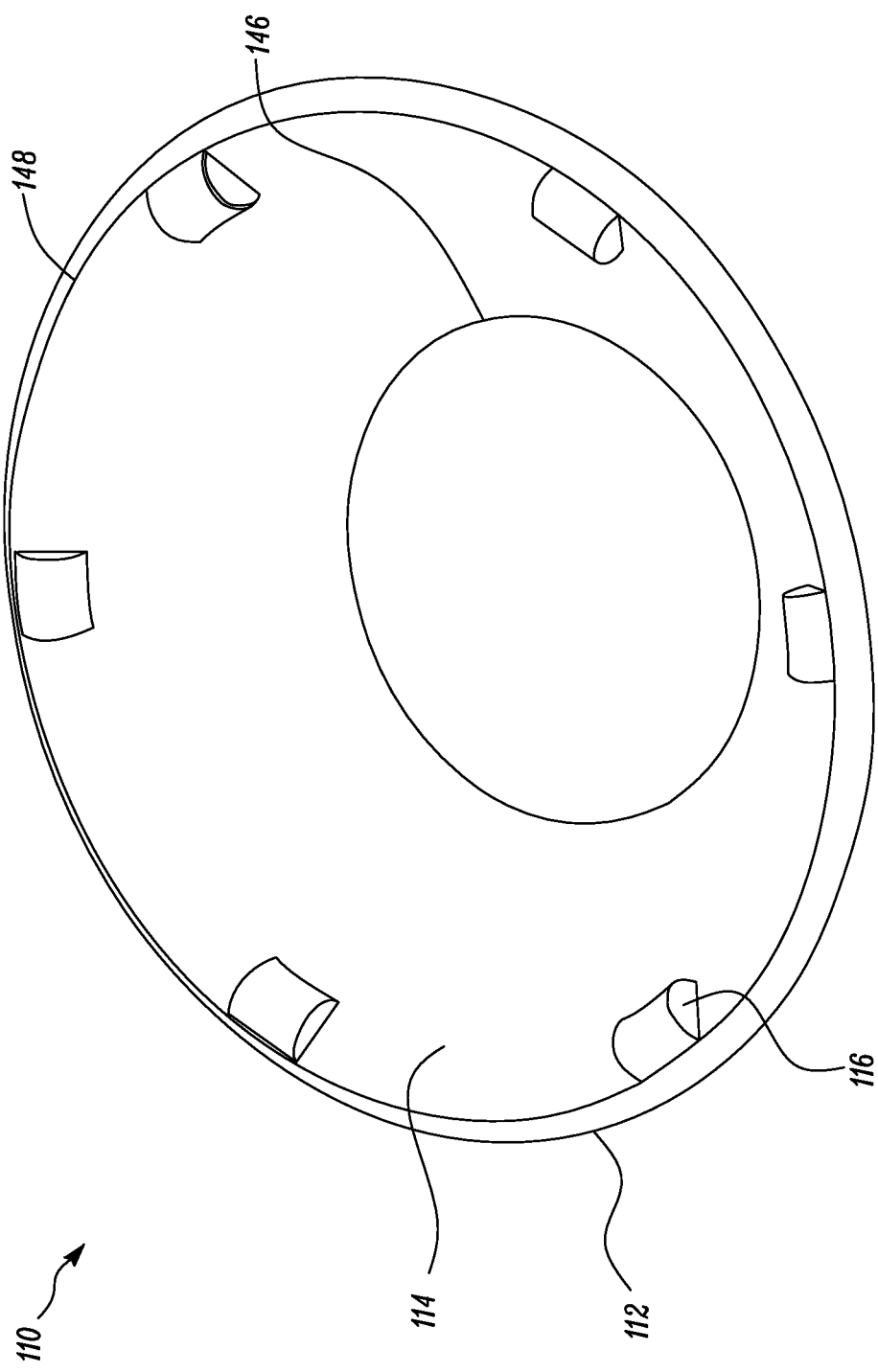
FIG. 4 illustrates a perspective view of an embodiment of the device including protrusions having a substantially semi-cylindrical shape.

Referring now to FIGS. 4-8, exemplary non-limiting alternative embodiments of device 110 are illustrated. In FIG. 4, an embodiment of device 110 includes protrusions 116 having a substantially semi-cylindrical shape.

Figure 5:
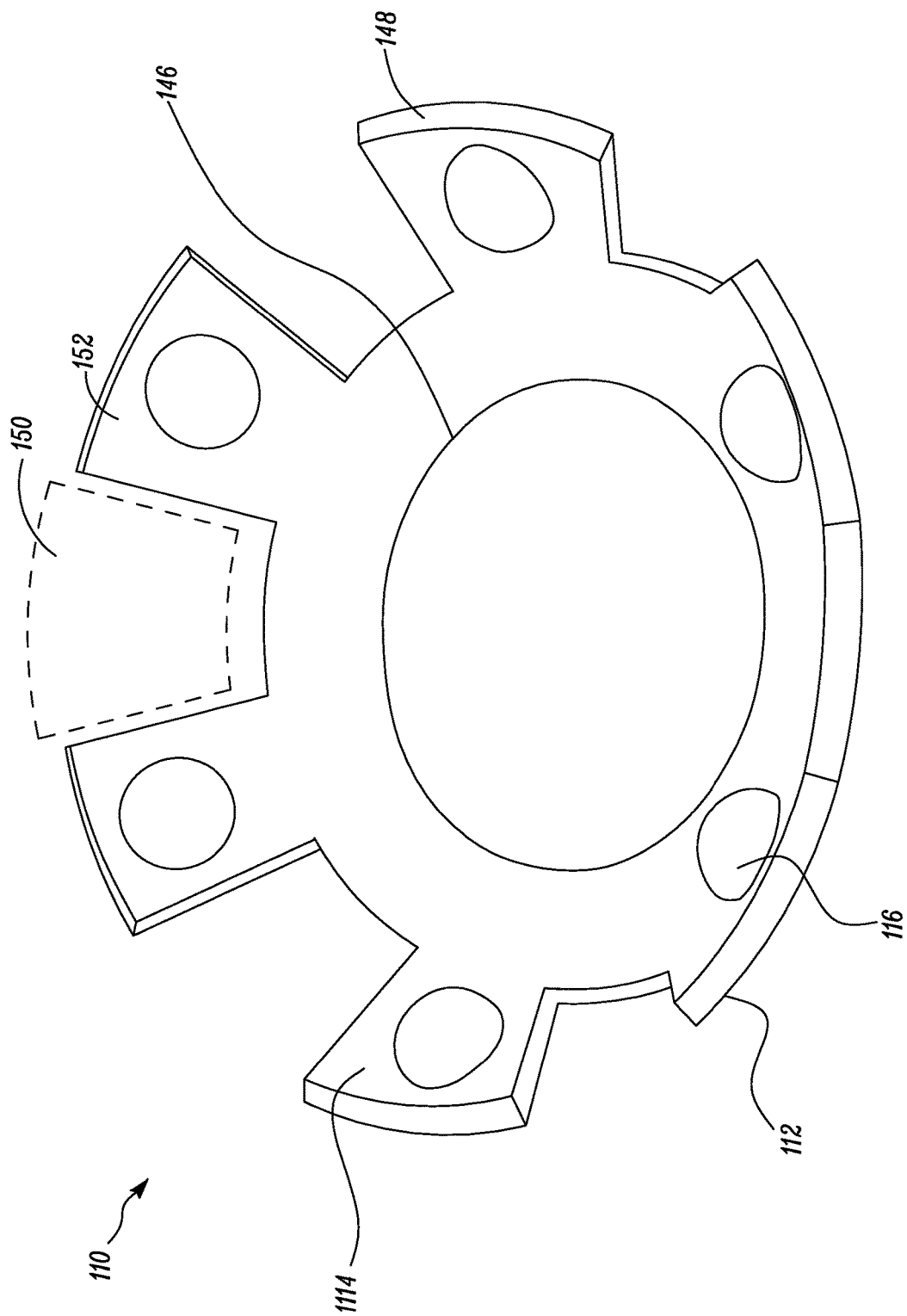
FIG. 5 illustrates perspective view of an alternative embodiment of the device.

In FIG. 5, portions 150 of interstitial areas 152 between adjacent protrusions 116 are removed from the alternative embodiment of device 110 illustrated, giving a toothed appearance and form to the device 110. In other embodiments, the device 110 may include other shapes depending on a specific sealing application of the device 110.

Figure 6:
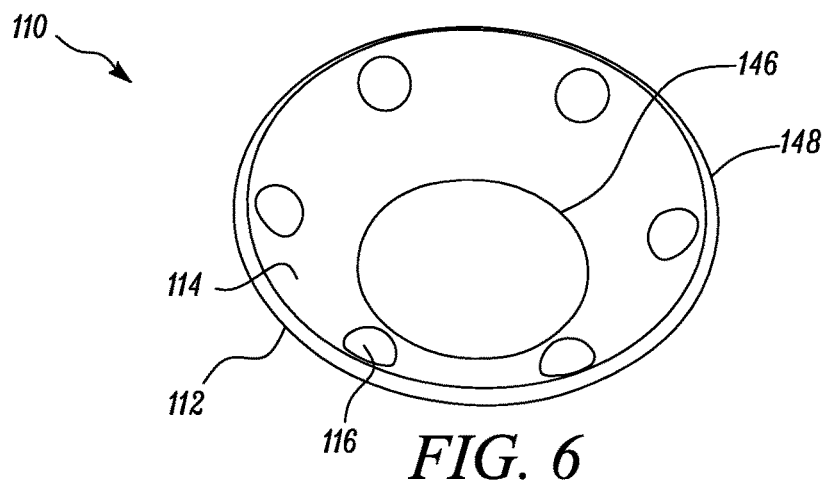
FIG. 6 illustrates a perspective view of an embodiment of the device showing protrusions disposed substantially close to an outer periphery of the device.

In FIG. 6, the protrusions 116 are disposed substantially close to the outer periphery 148 of the alternative embodiment of device 110 illustrated.

Figure 7:
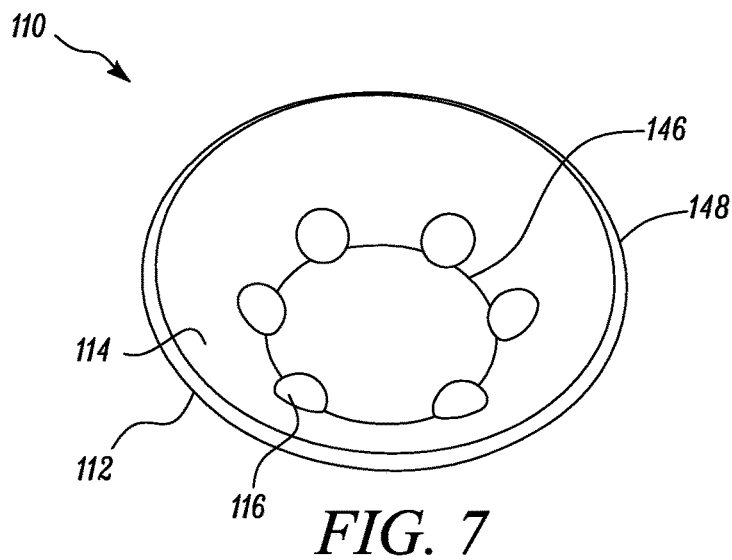
FIG. 7 illustrates a perspective view of an embodiment of the device showing protrusions disposed substantially close to an inner periphery of the device.

In FIG. 7, the protrusions 116 are disposed substantially close to the inner periphery 146 in the alternative embodiment of device 110 illustrated.

Figure 8:
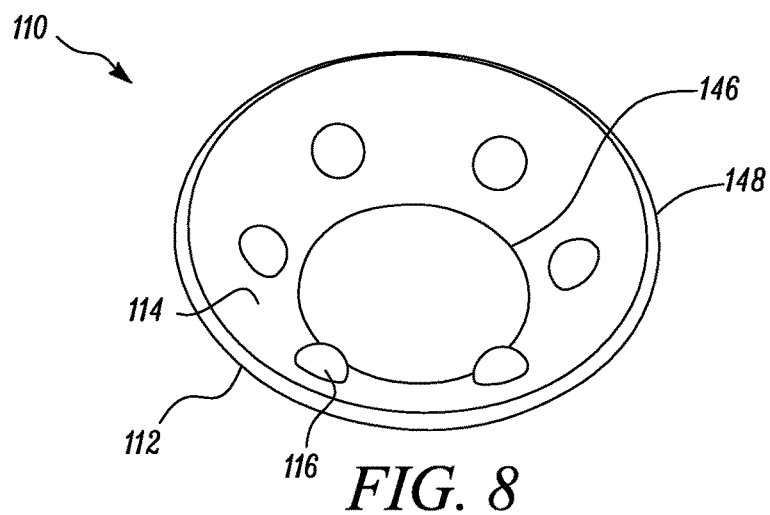
FIG. 8 illustrates a perspective view of an embodiment of the device showing protrusions disposed substantially between the inner periphery and outer periphery of the device.

In FIG. 8, the protrusions 116 are disposed substantially between the inner periphery 146 and outer periphery 148 of the frustum shaped alternative embodiment of device 110.

In FIGS. 6-8, the protrusions 116 are radially and equidistantly arranged on the inner surface 114 in the alternative embodiments of device 110 illustrated. In other alternative embodiments, the device 110 may include other arrangements of the protrusions 116 on the inner surface 114 as would be known by an ordinary person skilled in the art.

Figure 10:
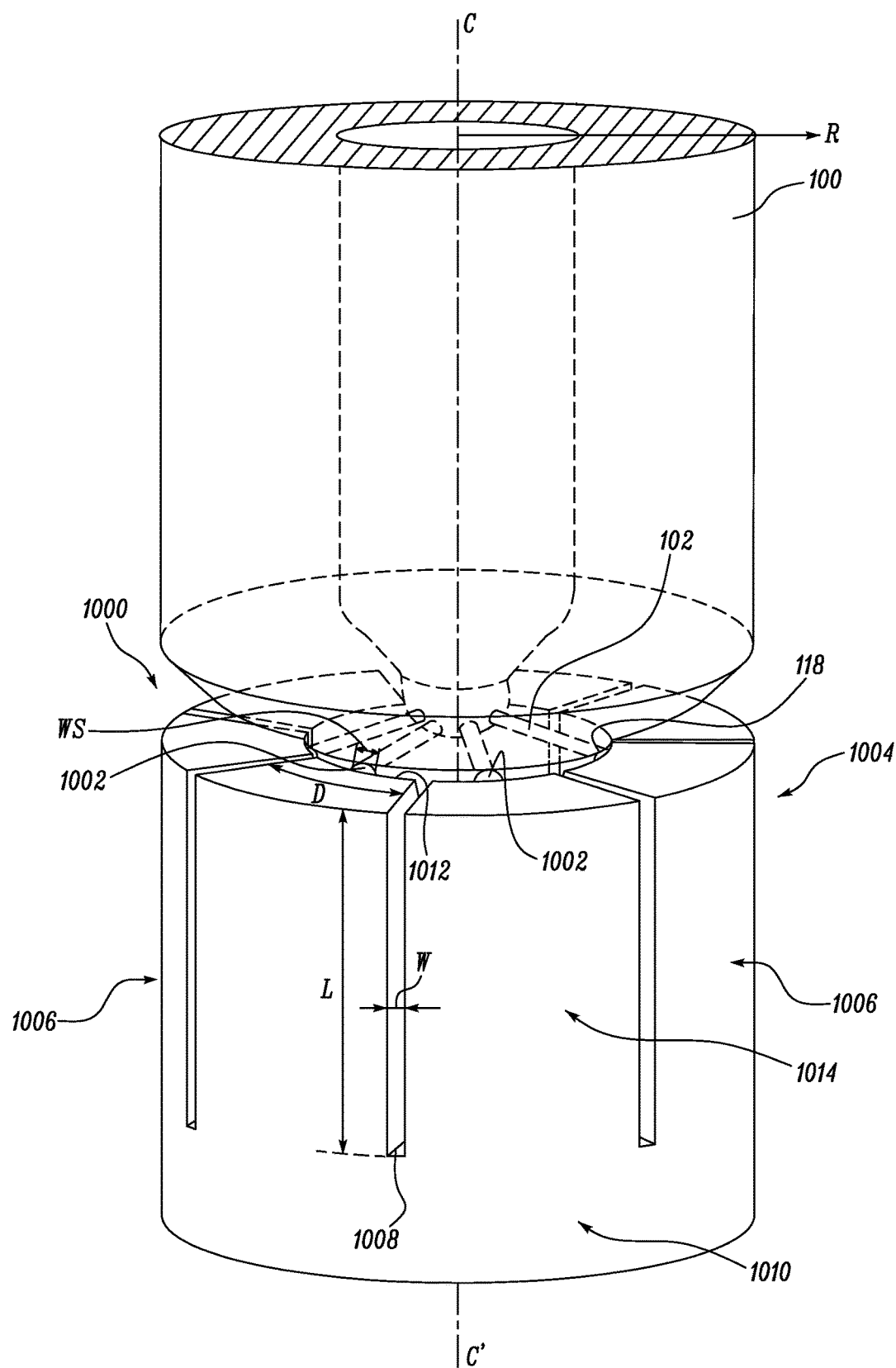
FIG. 10 illustrates a perspective view of an autofrettage system, according to an aspect of the disclosure.
Figure 11:
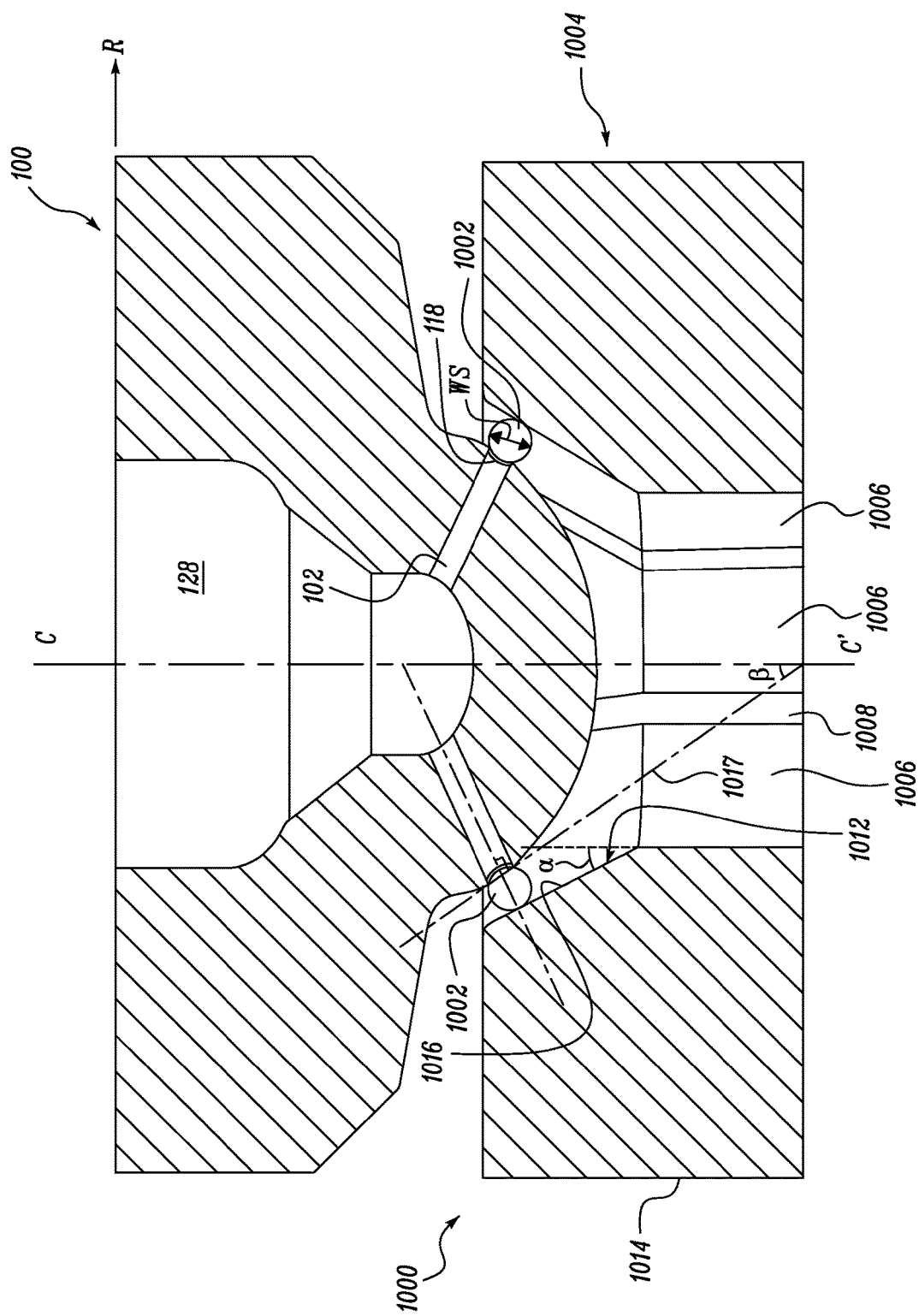
FIG. 11 illustrates a sectional view of the autofrettage system of FIG. 10.

FIG. 10 illustrates a perspective view of a system 1000, according to an aspect of the disclosure. FIG. 11 illustrates a sectional view of the system 1000. The system 1000 is configured to seal the plurality of orifices 102 through a wall of the vessel 100 is illustrated. According to an aspect of the disclosure, the system 1000 may be configured for use in an autofrettage process, the details of which are explained earlier in the document.

Referring now to FIGS. 10 and 11, the system 1000 includes plurality of sealing members 1002 configured to releasably seal respective orifices 102. According to an aspect of the disclosure, the sealing members 1002 may be spheroids having a dimension that is greater than a dimension of the orifices 102 through the vessel 100. Those skilled in the art will appreciate that the sealing members 1002 may include any shapes and/or dimensions operable to seal the orifices 102.

The system 1000 also includes a base 1004 defining a central axis C-C' therethrough. The base 1004 may be configured to retain the sealing members 1002 against respective orifices 102 during the autofrettage process.

Figure 12:
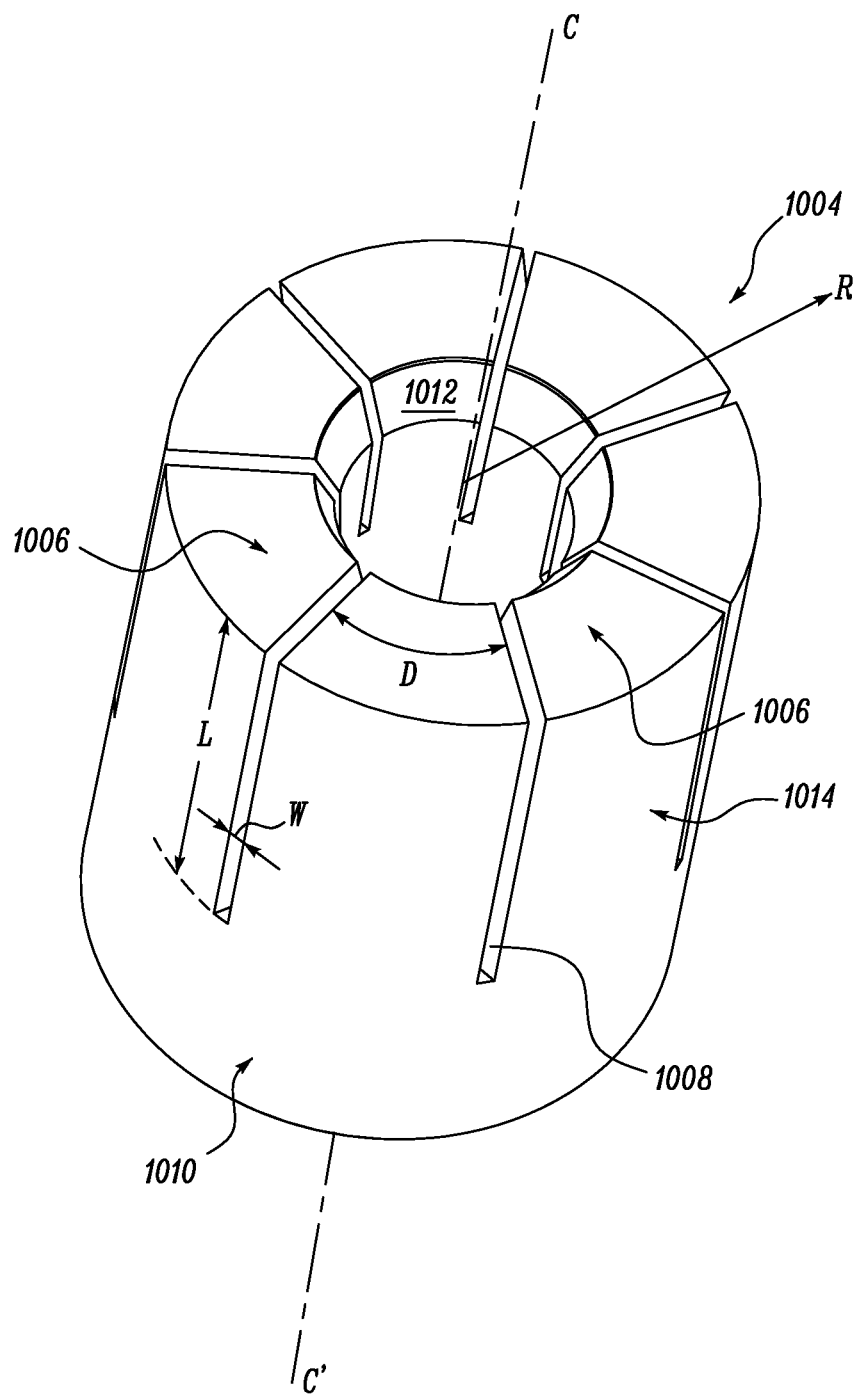
FIG. 12 illustrates a perspective view of a base for an autofrettage system, according to an aspect of the disclosure.

FIG. 12 illustrates a perspective view of the base 1004 for an autofrettage system, according to an aspect of the disclosure. In FIG. 12, the base 1004 has a substantially cylindrical shape. Alternatively, the base 1004 may have a frustoconical shape.

The base 1004 includes a plurality of segments 1006 disposed about the central axis C-C'. A pair of adjacent segments 1006 defines a slot 1008 therebetween. According to an aspect of the disclosure, the base 1004 includes an unsegmented portion 1010 disposed adjacent to the plurality of segments 1006 along the central axis C-C', such that the plurality of segments 1006 extend away from the unsegmented portion 1010 of the base 1004 along the central axis C-C'.

According to an aspect of the disclosure, each slot 1008 may have a transverse width 'W' which is smaller than an axial length 'L' of the slot 1008. In one example, the transverse width 'W' of the slot 1008 is about 300 microns and the axial length 'L' is about 10 mm. The high axial length 'L' relative to the transverse width 'W' may facilitate flexing of the segments 1006, and it will be appreciated that other ratios of L/W may be used for particular applications.

Referring to FIGS. 10 and 11, each of the segments 1006 includes an inner surface 1012 and an outer surface 1014. The inner surface 1012 may be configured to engage at least one sealing member 1002. According to an aspect of the disclosure, the sealing members 1002 may be removably attached to the inner surface 1012. Alternatively, the sealing members 1002 may be fixed to the inner surface 1012. Accordingly, an arcuate length 'D' measured at the inner surface 1012 of each segment 1006 may be greater than or equal to a width 'WS' of each of the sealing members 1002. With such a configuration, the inner surface 1012 may accommodate and engage at least one sealing member 1002, thereby preventing the sealing members 1002 from engaging the slots 1008 between the adjacent segments 1006.

The inner surface 1012 includes an inclined portion 1016 obliquely oriented with respect to the central axis C-C' of the base 1004. As illustrated in FIG. 11, the inclined portion 1016 has an inclination angle 'α' between the inclined portion 1016 and the central axis C-C'. The sealing members 1002 may be engaged with the inclined portion 1016. An outlet angle 'β' of the orifices 102 may be defined between a tangent 1017 to an outer surface of the orifices 102 and the central axis C-C'. According to an aspect of the disclosure, the inclination angle 'α' is equal to the outlet angle 'β' of the orifices 102 of the vessel 100. Further, the inclination angles 'α' of the segments 1006 may be equal to the outlet angles 'β' of the respective orifices 102. For example, for a vessel with asymmetric orifices, i.e., at least one orifice having an outlet angle different from outlet angles of other orifices, the inclination angle 'α' of the corresponding segment 1006 may be different. However, the inclination angle 'α' for each of the segments 1006 may vary to suit the various design requirements of the vessel 100.

It will be appreciated that the outlet angles 'β' do not necessarily have to equal corresponding inclination angles 'α'. For example, the inclination angle 'α' may vary with the degree of deformation of the corresponding segment 1006. According to an aspect of the disclosure, the inclination angle 'α' may be greater than the outlet angle 'β' when the corresponding segment 1006 is in a relaxed state, and then the inclination angle 'α' could be reduced by deformation of the corresponding segment 1006 to be substantially equal to the outlet angle 'β', less than the outlet angle 'β' in a deformed state, or still greater than the outlet angle 'β' but by a lesser degree.

Further, a hardness of a material of the base 1004 may be greater than a hardness of a material of the sealing members 1002. As a result, the base 1004 may be able to plastically deform the sealing members 1002 into sealing engagement with the respective orifices 102. However, the base 1004 may be used for multiple autofrettage processes. In an example, the material of the base 1004 may be high grade steel with a hardness of 50 to 55 Rockwell C. The sealing members 1002 may be made of stainless steel with a hardness of about 30 Rockwell C.

According to an aspect of the disclosure, a number of the segments 1006 of the base 1004 is equal to a number of sealing members 1002. Thus, each of the segments 1006 engages one of the sealing members 1002. However, according to other aspects of the disclosure, each of the segments 1006 may engage two or more of the sealing members 1002.

Figure 13:
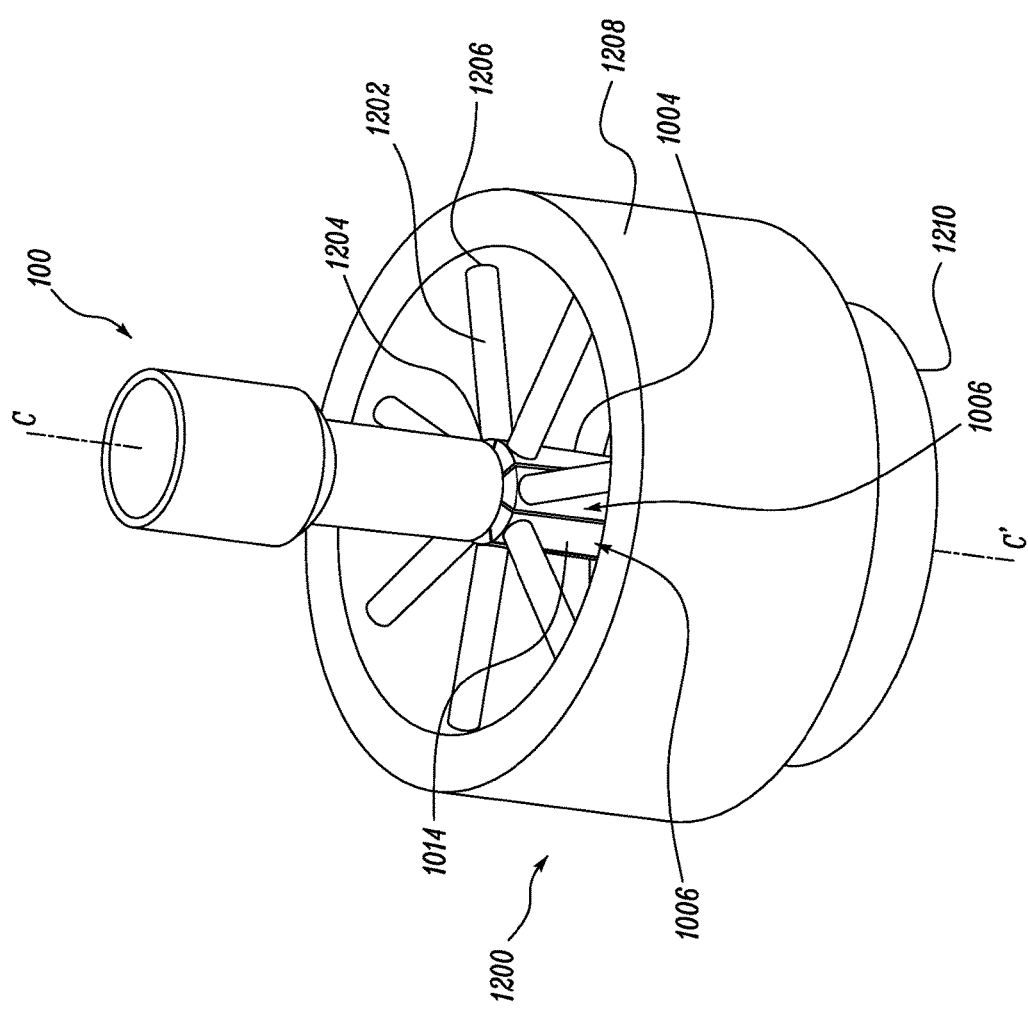
FIG. 13 illustrates a perspective view of a fixture for an autofrettage system, according to an aspect of the disclosure.
Figure 14:
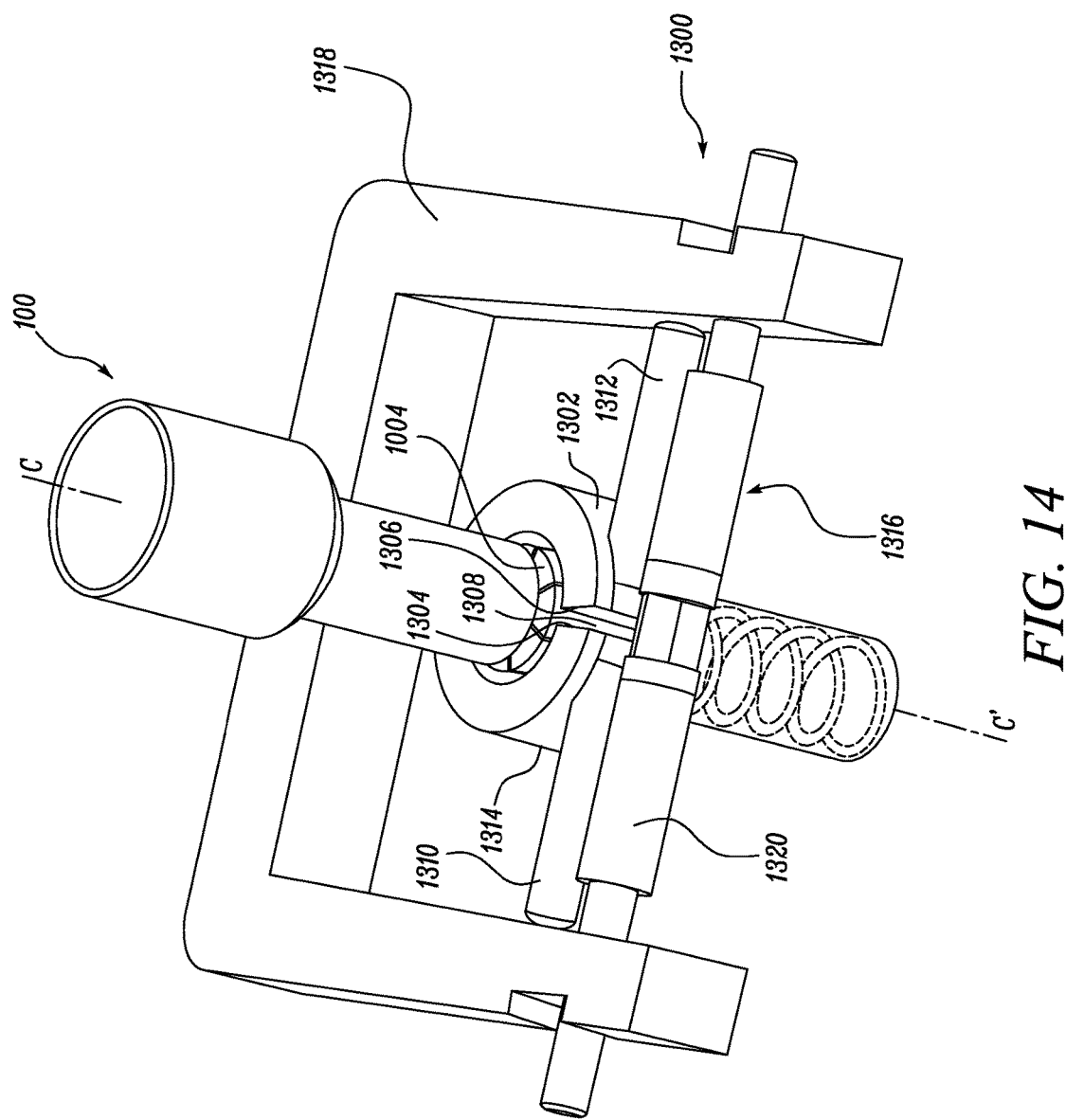
FIG. 14 illustrates a perspective view of a fixture for an autofrettage system, according to an aspect of the disclosure.
Figure 15:
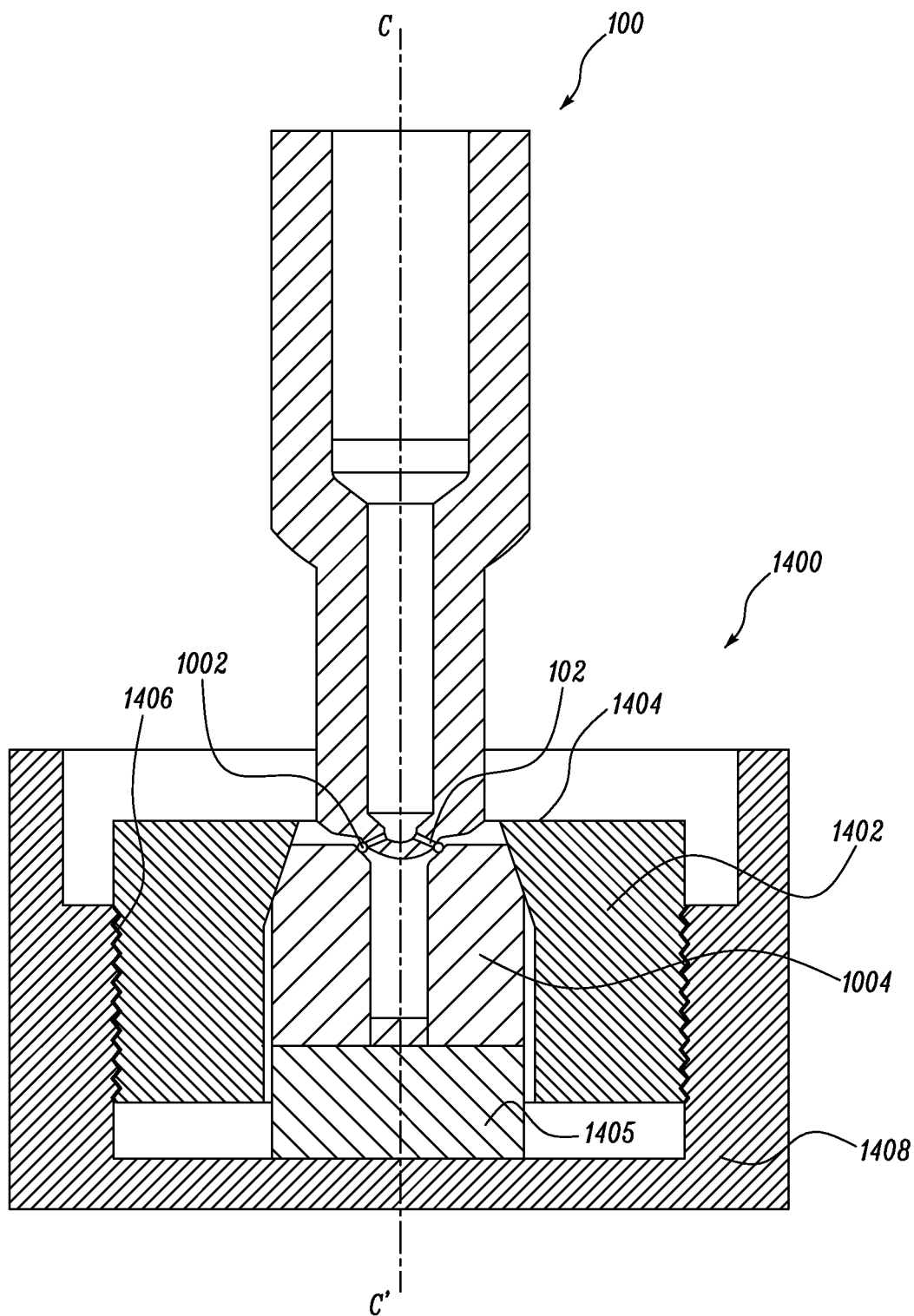
FIG. 15 illustrates a perspective view of a fixture for an autofrettage system, according to an aspect of the disclosure.

Referring now to FIGS. 13-15, various exemplary fixtures associated with the system 1000 are illustrated. The fixtures may be configured to apply a force on the outer surface 1014 of the segments 1006. The force may be applied in a radial direction R being normal to the central axis C-C' of the base 1004. Additionally or optionally, the fixtures may be configured to apply a different magnitude of force on different segments 1006. Upon application of the force, each of the segments 1006 may deform in the radial direction R toward the central axis C-C'. According to an aspect of the disclosure, each of the segments 1006 may deform independently toward the central axis C-C'.

The segmentation of the base 1004 may further enable the segments 1006 to provide varying force on the respective sealing members 1002. Subsequently, the sealing members 1002 in engagement with the segments 1006 may also deform. The deformation may be a plastic deformation. Such a deformation may bias the sealing members 1006 into sealing engagement with the respective orifices 102 of the vessel 100.

The fixture 1200, as illustrated in FIG. 13, includes a plurality of rods 1202 disposed radially about the central axis C-C' of the base 1004. One end 1204 of each of the rods 1202 engages with the outer surfaces 1014 of the corresponding segments 1006. Further, other end 1206 of each of the rods 1202 abuts a collar 1208. The collar 1208 may include a tapered surface (not shown). The fixture 1200 further includes a nut 1210 disposed below the collar 1208. The nut 1210 may be configured to provide a sliding motion to the collar 1208 along the central axis C-C'. Subsequently, due to the tapered surface, the collar 1208 may apply radial forces on the rods 1202 which in turn apply force on the outer surface 1014 of the segments 1006. The fixture 1200 may also include a spring (not shown) to bias the base 1004 towards the vessel 100 along the central axis C-C'. In an alternative aspect of the disclosure, the collar 1208 may be hydraulically activated.

The fixture 1300, as illustrated in FIG. 14, includes a split collar 1302 that encloses the base 1004. The split collar 1302 includes a pair of ends 1304, 1306. The ends 1304, 1306 define a slot 1308 there between. A pair of push pins 1310, 1312 may abut an outer surface 1314 of the split collar 1302. Upon driving the push pins 1310, 1312 either manually or by any mechanism, such as hydraulic actuators known in the art, the ends 1304, 1306 of the split collar 1302 may be pushed towards each other. Subsequently, the split collar 1302 applies a force on the outer surface 1014 of the segments 1006. In the embodiment of FIG. 13, the fixture 1300 includes an actuation mechanism 1316 to move the push pins 1310, 1312 towards each other. The actuation mechanism 1316 may include a first member 1318 and a second member 1320. The first member 1318 may be in the form of a tapered handle slidable with respect to the second member 1320. Sliding of the first member 1318 may actuate the push pins 1310, 1312 towards each other.

The fixture 1400, as illustrated in FIG. 15, includes a clamp 1402 with an internal bore and an internal cone that encloses the base 1004. The clamp 1402 includes inclined portions adjacent to a top surface 1404. The inclined portions may be configured to engage complementary tapered surfaces of the clamp 1402 such that the clamp 1402 may retain the base 1004 against the vessel 100. The fixture 1400 may include a support member 1405 that is disposed below the base 1004 such that the base 1004 may rest on the support member 1405. The base 1004 may be aligned with the support member 1405 by dowel pins (not shown). In an aspect of the disclosure, the clamp 1402 may include two halves which are assembled with the base 1004 and the support member 1405. Further, one or more spacer plates (not shown) may be placed underneath the support member 1405 to position the support member 1405 below the base 1004. The fixture 1400 also includes a retainer ring (not shown) that may be disposed around the clamp 1402 to lock the two halves of the clamp 1402. Further, a support tool (not shown) may be provided to at least partially enclose an assembly of the clamp 1402 and the retainer ring. One or more spacer plates may be used to align the support tool relative to the clamp 1402. The clamp 1402 further includes threads 1406 disposed on an outer surface thereof. The threads 1406 are coupled to a clamp nut 1408 disposed around the clamp 1402 in a threaded engagement. The vessel 100 and the sealing members 1002 may be assembled over the fixture 1400. Further, the vessel 100 and the fixture 1400 may be secured to each other with a lock nut (not shown). The clamp nut 1408 may be rotated to provide a sliding motion to the clamp 1402 via the threaded engagement which in turn applies a force on the outer surface 1014 of the segments 1006.

According to an aspect of the disclosure, the system 1000 may be configured for use in an autofrettage process. The sealing members 1002 are configured to contact the edge 118 of the orifices 102. As illustrated, upon contact of the sealing members 1002, the fixtures 1200, 1300 and 1400 may apply a radial force on the outer surface 1014 of the base 1004 such that the sealing members 1002 are biased towards the orifices 102. Further, application of force on the outer surface 112 may plastically deform the sealing members 1002 at the edge 118 of the orifices 102 and seal the orifices 102. The autofrettage process may be then started by pressurizing an interior volume 128 of the nozzle 122 using the autofrettage liquid 108 as explained with reference to FIGS. 1-3. Upon completion of the autofrettage process, the system 1000 may be withdrawn from the nozzle 122 such that the sealing members 1002 are withdrawn from the respective orifices 102. Alternatively, the system 1000 may be used to seal the orifices 102 of the vessel 100 in association with any other process such as pressure testing etc.

It may be contemplated that the dimensions, material, shape and arrangement of the sealing members 1002, the base 1004, and the fixtures 1200, 1300 and 1400 may vary to suit the design requirements of the vessel 100 as would be known by any person skilled in the art.

INDUSTRIAL APPLICABILITY

Figure 9:
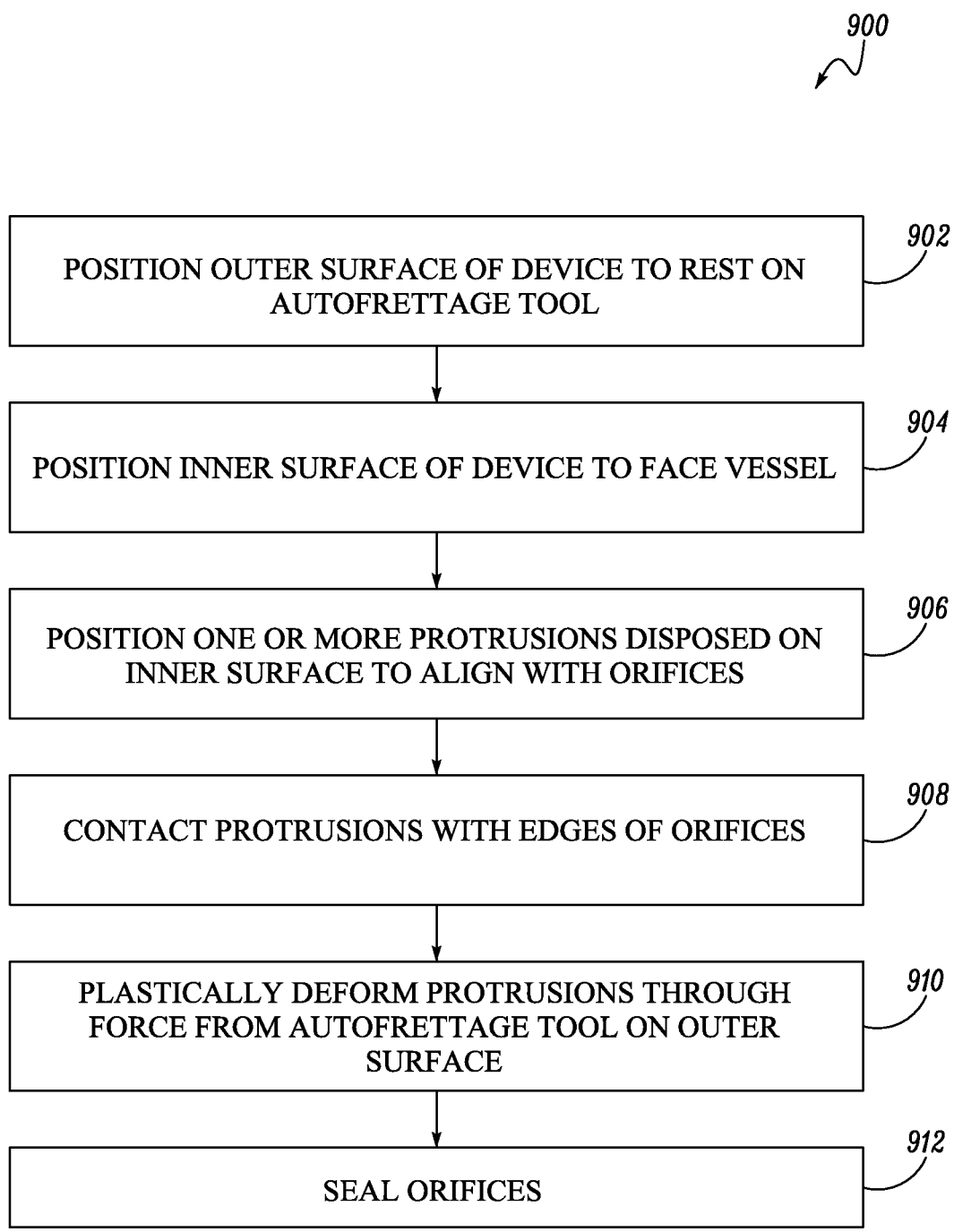
FIG. 9 is a method of sealing the orifices on the vessel for pressurizing fluid.

FIG. 9 illustrates a method 900 of sealing the orifices 102 on the vessel 100 for pressurizing fluid using the device 110 described in reference to FIGS. 1 to 8. At step 902, the method 900 includes positioning the outer surface 112 of the device 110 to rest on the autofrettage tool 120. At step 904, the method 900 includes positioning the inner surface 114 of the device 110 to face the vessel 100. At step 906, the method 900 includes positioning the protrusions 116 to align with the orifices 102. At step 908, the method 900 includes contacting the protrusions 116 with the edge 118 of the orifices 102. At step 910, the method 900 includes plastically deforming the protrusions 116 through a force from the autofrettage tool 120 on the outer surface 112. At step 912, the method 900 includes sealing the orifices 102.

In an embodiment, the method 900 is employed in autofrettaging a fuel injector tip 106 including a nozzle 122 having orifices 102 thereon. In one embodiment, aligning the protrusions 116 on the inner surface 114 with the orifices 102 includes aligning the indicia 136 on the device 110 with the timing mark 138 on the autofrettage tool 120. In another embodiment, aligning the protrusions 116 on the inner surface 114 with the orifices 102 includes aligning the indicia 136 on the device 116 with the timing mark 140 on the fuel injector tip 106.

In one known method of autofrettaging, orifices on high pressure vessels have been sealed with tiny individual spheres sucked onto edges of the orifices using vacuum suction processes. In some cases, more than one sphere may be sucked onto each orifice leading to partial or no sealing of the orifice. Therefore, these processes for sealing the orifices may require close monitoring of the spheres to ensure that a single sphere aligns with a single orifice.

With the device 110 of the present disclosure, the protrusions 116 configured to seal the orifices 102 are integrated with the inner surface 114. The number of protrusions 116 may be selected such that the protrusions 116 correspond to the orifices 102 on the vessel 100 and the locations of the protrusions 116 may be selected to correspond to the location of the orifices 102 on the vessel 100 such that each one of the protrusions 116 seals each one of the orifices 102 on the vessel 100.

Figure 16:
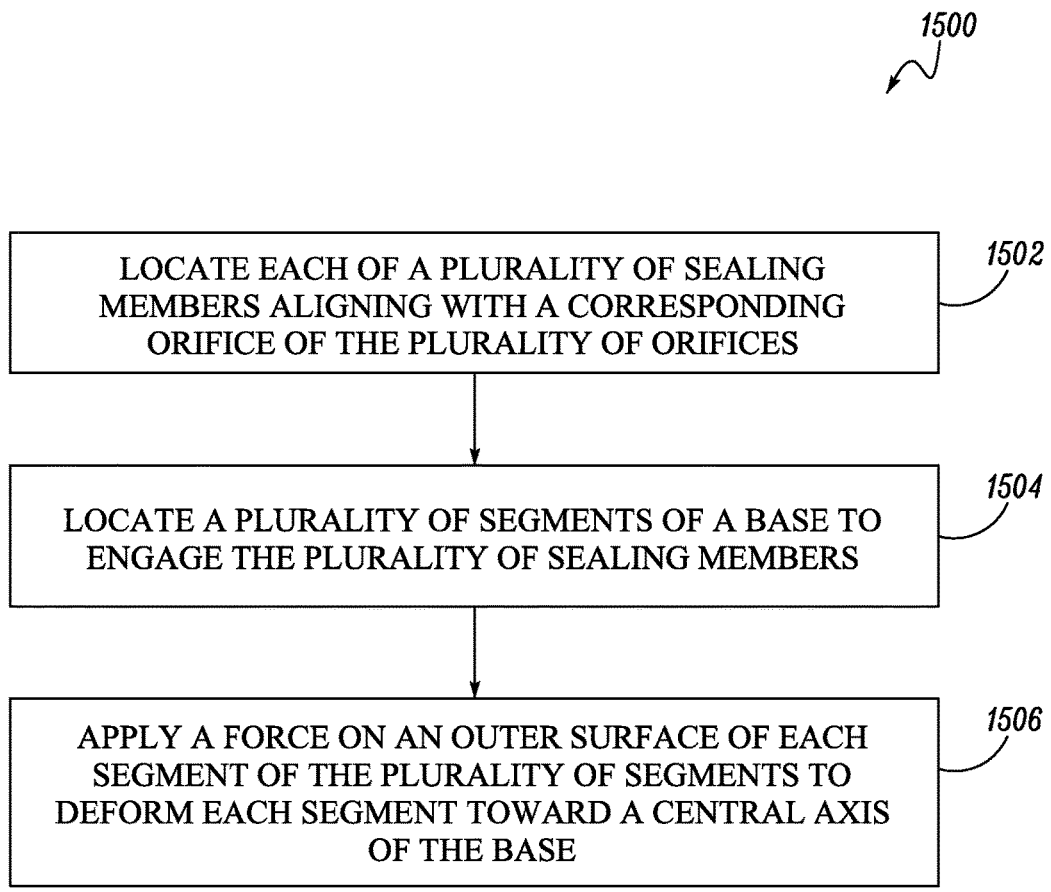
FIG. 16 is a flowchart for a method of sealing orifices on a vessel for an autofrettage system.

FIG. 16 illustrates a method 1500 of sealing the orifices 102 through a wall of the vessel 100 which may be implemented with the system 1000 described with reference to FIGS. 10 to 14. At step 1502, the method 1500 includes locating each of the sealing members 1002 to align with a corresponding orifice 102 of the vessel 100. At step 1504, the method 1500 includes locating the segments 1006 to engage the sealing members 1002. At step 1506, the method 1500 includes applying a force on the outer surface 1014 of each segment 1006 to deform each segment 1006 toward a central axis C-C' of the base 1004 in order to bias the sealing members 1002 into sealing engagement with the orifices 102.

Further, the system 1000 of the present disclosure provides separate sealing members 1002 to seal the orifices 102 that are removably attached to the base 1004. Further, a force applied in the radial direction R to the base 1004 transforms to a normal load on the sealing members 1002. With such loading, for the nozzle 122 with any inclination angle 'α', rolling of the sealing members 1002 relative to the respective orifices 102 along the inner surface 1012 of the base 1004 may be prevented.

The segmentation of the base 1004 into plurality of segments 1006 facilitates the application of a force in the radial direction R on the base 1004. Further, each of the segments 1006 may be independently deformed. Subsequently, each of the segments 1006 may apply different forces on the respective sealing members 1002 as per requirements. With such an arrangement, the sealing members 1002 may seal the orifices 102 having any configuration, for example, having different outlet angles, or having different positions along the central axis C-C'.

Additionally, the base 1004 may be segmented such that the inner surfaces 1012 of each segment 1006 conform to the outlet angles 'β' of the corresponding orifices 102. With such an implementation, the system 1000 and the corresponding base 1004 may be used for nozzles with any variation of spray angles. In one example, the system 1000 may be used for a nozzle with asymmetrically positioned orifices or orifices with larger spray angles with respect to the central axis C-C'.

Further, repeated use of the base 1004 for multiple autofrettage processes may be facilitated by providing the base 1004 with hardness greater than the hardness of the sealing members 1002.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

We claim:

1. A system for sealing a plurality of orifices through a wall of a vessel, the system comprising:
   a plurality of sealing members configured to releasably seal respective orifices of the plurality of orifices; and
   a base including a plurality of segments of the base, the base defining a central axis therethrough, wherein the base and the plurality of segments of the base are disposed along the central axis;
   each of the plurality of segments comprising:
      an outer surface; and
      an inner surface configured to engage at least one sealing member of the plurality of sealing members;
   wherein a pair of adjacent segments of the plurality of segments define a slot therebetween and each segment of the plurality of segments is configured to deform toward the central axis on application of a force upon the outer surface thereof to bias the at least one sealing member into sealing engagement with a respective orifice of the plurality of orifices; and
   wherein the inner surface of each of the plurality of segments comprises an inclined portion, wherein the inclined portion of each of the plurality of segments is obliquely oriented with respect to the central axis of the base and angled to engage with and bias the at least one sealing member into sealing engagement with a respective orifice of the plurality of orifices of the vessel at an inclination angle of the inclined portion which is equal to an outlet angle of the respective orifice.

2. The system of claim 1, wherein the plurality of segments extend from an unsegmented portion of the base along the central axis.

3. The system of claim 1, wherein a circumferential length of the inner surface of each of the segments of the base is greater than or equal to a dimension of each of the plurality of sealing members.

4. The system of claim 1, wherein a number of the plurality of segments of the base is equal to a number of the plurality of sealing members, and wherein each segment of the plurality of segments is configured to engage one sealing member of the plurality of sealing members.

5. The system of claim 1, further comprising a fixture configured to apply the force on the outer surface of the plurality of segments.

6. The system of claim 1, wherein a hardness of a material of the base is greater than a hardness of a material of the sealing members.

7. The system of claim 1, wherein the system is configured to seal orifices on a nozzle of a fuel injector.

8. The system of claim 1, wherein the system is configured for use in an autofrettage process.

9. A system for sealing a plurality of orifices through a wall of a vessel comprising:
- a cylindrical base including a plurality of segments of the base, the base defining a central axis therethrough wherein the base and the plurality of segments are disposed about the central axis;
- each of the plurality of segments comprising:
  - an outer surface; and
  - an inner surface configured to engage at least one sealing member of the plurality of sealing members;
- wherein a pair of adjacent segments of the plurality of segments define a slot therebetween, wherein each slot defined between each pair of adjacent segments includes a transverse width which is smaller than an axial length of each slot, and wherein each segment of the plurality of segments is configured to deform toward the central axis on application of a force upon the outer surface thereof to bias the at least one sealing member into sealing engagement with a respective orifice of the plurality of orifices; and
- wherein the inner surface comprises an inclined portion obliquely oriented with respect to the central axis of the base, the inclined portion configured to engage with the at least one sealing member wherein the inclined portion of the inner surface of each segment of the plurality of segments is configured to deform toward the central axis on application of a force applied to the outer surface of each segment of the plurality of segments in a radial direction normal to the central axis of the base to engage with and bias the at least one sealing member into sealing engagement with a respective orifice of the plurality of orifices of the vessel at an inclination angle which is equal to an outlet angle of the respective orifice.

10. The system of claim 9, wherein the plurality of segments extend from an unsegmented portion of the base along the central axis.

11. The system of claim 9, wherein a circumferential length of the inner surface of each of the segments of the base is greater than or equal to a dimension of each of the plurality of sealing members.

12. The system of claim 9, wherein a hardness of a material of the base is greater than a hardness of a material of the sealing members.

13. The system of claim 9, wherein a number of the plurality of segments of the base is equal to a number of the plurality of sealing members, and wherein each segment of the plurality of segments is configured to engage one sealing member of the plurality of sealing members.

14. The system of claim 9, wherein the system is configured to seal orifices on a nozzle of a fuel injector.

15. The system of claim 9, wherein the system is configured for use in an autofrettage process.

16. A method for sealing, the method comprising:
- locating each of a plurality of sealing members to align with a corresponding orifice of a plurality of orifices through a wall of a vessel;
- providing a base which defines a central axis therethrough and includes a plurality of segments disposed along the central axis;
- locating the plurality of segments of the base to engage the plurality of sealing members;
- applying a force in a radial direction normal to the central axis of the base on an outer surface of each segment of the plurality of segments to deform each segment toward the central axis of the base to bias the plurality of sealing members into sealing engagement with the plurality of orifices; and
- providing an inner surface of each of the plurality of segments with an inclined portion which is obliquely oriented with respect to the central axis and engages at least one of the plurality of sealing members such that upon the application of the force on the outer surface of each segment of the plurality of segments to deform each segment toward the central axis of the base, the inclined portion of the inner surface of each segment of the plurality of segments engages with and biases the at least one sealing member into sealing engagement with a respective orifice of the plurality of orifices of the vessel at an inclination angle which is equal to an outlet angle of the respective orifice.

* * * * *